(12) United States Patent
Cheng et al.

(10) Patent No.: US 9,766,493 B2
(45) Date of Patent: Sep. 19, 2017

(54) LIQUID CRYSTAL DISPLAY

(71) Applicant: Shenzhen China Star Optoelectronics Technology Co., Ltd., Shenzhen (CN)

(72) Inventors: Xiaoping Cheng, Shenzhen (CN); Hsiaohsien Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 78 days.

(21) Appl. No.: 14/762,471

(22) PCT Filed: May 20, 2015

(86) PCT No.: PCT/CN2015/079383
§ 371 (c)(1),
(2) Date: Jul. 22, 2015

(87) PCT Pub. No.: WO2016/155091
PCT Pub. Date: Oct. 6, 2016

(65) Prior Publication Data
US 2017/0045778 A1  Feb. 16, 2017

(30) Foreign Application Priority Data
Apr. 3, 2015 (CN) .......................... 2015 1 0158198

(51) Int. Cl.
*G02F 1/1335* (2006.01)
*G02F 1/1337* (2006.01)
(Continued)

(52) U.S. Cl.
CPC ...... *G02F 1/133528* (2013.01); *G02F 1/1335* (2013.01); *G02F 1/1337* (2013.01);
(Continued)

(58) Field of Classification Search
CPC .... G02F 1/1333; G02F 1/1335; G02F 1/1337; G02F 1/136; G02F 1/133514;
(Continued)

(56) References Cited

U.S. PATENT DOCUMENTS

| | | | |
|---|---|---|---|
| 9,421,572 B2* | 8/2016 | Hatanaka | G02B 5/3016 |
| 2015/0331278 A1* | 11/2015 | Araki | G02F 1/133514 349/61 |
| 2016/0070136 A1* | 3/2016 | Jang | G02F 1/133514 349/61 |

FOREIGN PATENT DOCUMENTS

| | | |
|---|---|---|
| CN | 1867637 A | 11/2006 |
| CN | 104280935 A | 1/2015 |

* cited by examiner

*Primary Examiner* — Thoi Duong
(74) *Attorney, Agent, or Firm* — Leong C. Lei

(57) ABSTRACT

The liquid crystal display provided by the present invention acquires the light of linear polarization by doping the quantum-dot material in the color resist layer to excite the quantum-dots by the backlight to form the light of a certain light spectrum and cooperating with the anisotropic polarization layer manufactured by organic dye molecules for selectively allowing the light of different polarization states to pass through. The light leakage issue due to the light polarization state change caused by the quantum-dot material can be effectively solved to raise the contrast ratio. The polarization layer can be employed to replace the upper or the lower polarizer, and thus, one polarizer attachment process can be omitted to simplify the process, to save the cost and meanwhile to achieve better polarization result.

19 Claims, 5 Drawing Sheets

(51) Int. Cl.
*G02F 1/1368* (2006.01)
*G02F 1/1333* (2006.01)
(52) U.S. Cl.
CPC ...... *G02F 1/1368* (2013.01); *G02F 1/133512* (2013.01); *G02F 1/133514* (2013.01); *G02F 2001/133302* (2013.01); *G02F 2201/121* (2013.01); *G02F 2201/123* (2013.01); *G02F 2202/04* (2013.01); *G02F 2202/36* (2013.01); *G02F 2203/05* (2013.01)
(58) Field of Classification Search
CPC ............. G02F 1/1368; G02F 1/133512; G02F 1/133528; G02F 1/13378; G02F 2202/36; B82Y 20/00; G02B 5/30
USPC ....... 345/690; 349/61, 42, 96, 106, 110, 123
See application file for complete search history.

LIQUID CRYSTAL DISPLAY

FIELD OF THE INVENTION

The present invention relates to a display technology field, and more particularly to a liquid crystal display.

BACKGROUND OF THE INVENTION

The LCD (Liquid Crystal Display) possesses advantages of thin body, power saving and no radiation to be widely used in many application scope. It has been widely utilized in, such as mobile phones, PDAs (personal digital assistance), digital cameras, laptop screens or notebook screens. The present thin film transistor liquid crystal display comprises a shell, a LCD panel located in the shell and a backlight module located in the shell. Particularly, the structure of the LCD panel mainly comprises a TFT Array Substrate (Thin Film Transistor Array Substrate), a CF (Color Filter) and a Liquid Crystal Layer. The working principle is that the light of backlight module is reflected to generate images by applying driving voltages to the two glass substrate for controlling the rotations of the liquid crystal molecules.

Quantum dot is a semiconductor nano crystal, of which the radius is smaller then or close to Bohr radius and is three dimension nano material that most is composed by II-VI elements or III-V elements. Because of the quantum confinement effect, the transportation of the inner electrons and holes are restricted to make the continuous energy band structure become the disjunct level structure. When the dimensions of the quantum dots are different, the confinement degrees of the electrons and the holes are different and the disjunct level structures are different. After being excited by the external energy, the lights of various wavelengths, i.e. the light of kinds of colors, are emitted by the quantum dots of various dimensions. The advantages of the quantum dots are: by controlling the dimensions of the quantum dots, the achievable light emitting wavelength range can cover the infrared ray to the entire visible light band. The light emitting band is narrow, and the color saturation is high; the quantum conversion efficiency of the quantum dot material is high; the material property is stable; the manufacture method is simple but varied. It can be manufactured by solution and the resource is very much.

The liquid crystal display based on quantum dots is the most possible display device to achieve the practicability to provide significant function in the field of information communication and transmission. The fluorescence intensity and the stability of the quantum dot is very well and the quantum dot display will possess advantages of better image quality, lower power consumption, longer usage lifetime, and becomes one main direction of display technology development in the future. As being the light source of the backlight module in the liquid crystal display screen, the light excited by the blue light LED and the blue light are mixed to be white light having larger color gamut, and significantly promoting the image display quality.

FIG. 1 is a sectional structure diagram of a liquid crystal display according to prior art. It comprises a backlight module 100, and a liquid crystal panel 200 positioned on the backlight module 100; the liquid crystal panel 200 comprises a TFT substrate 210, a glass substrate 220 oppositely positioned to the TFT substrate 210, a color resist layer 230 positioned on the TFT substrate 210, a pixel electrode layer 240 positioned on the color resist layer 230, a liquid crystal layer 260 filled between the TFT substrate 210 and the glass substrate 220, alignment layers 270 respectively positioned at two side of the liquid crystal layer 260, a black matrix 280 positioned on the glass substrate 220, an upper polarizer 290 positioned on the upper surface of the glass substrate 220 and a lower polarizer 390 positioned at the lower surface of the TFT substrate 210, wherein the color resist layer 230 is a color resist layer doped with quantum dot material.

FIG. 2 is another sectional structure diagram of a liquid crystal display according to prior art. It comprises a backlight module 100, and a liquid crystal panel 200 positioned on the backlight module 100; the liquid crystal panel 200 comprises a TFT substrate 210, a glass substrate 220 oppositely positioned to the TFT substrate 210, a color resist layer 230 positioned on the glass substrate 220, a pixel electrode layer 240 positioned on the color resist layer 230, a liquid crystal layer 260 filled between the TFT substrate 210 and the glass substrate 220, alignment layers 270 respectively positioned at two side of the liquid crystal layer 260, a black matrix 280 positioned on the glass substrate 220, an upper polarizer 290 positioned on the upper surface of the glass substrate 220 and a lower polarizer 390 positioned at the lower surface of the TFT substrate 210, wherein the color resist layer 230 is a color resist layer doped with quantum dot material.

However, the liquid crystal display based on quantum dots must have some drawbacks as possessing many advantages. As shown in FIG. 1, after the light passes through the color resist layer 230 doped with quantum dot material, the outgoing direction is random. AS the scattering light through the color resist layer 230 passes through the liquid crystal layer 260, all lights of corresponding pixel dot positions cannot be well controlled anymore, and the liquid crystal display will occur the light leakage phenomenon. The working principle of the liquid crystal display is to utilize the optical rotation and the birefraction of the liquid crystal for controlling the rotation of the liquid crystal with the voltages and rotating the linearly polarized light passing through the upper polarizer thereby, and then raying the light from the lower polarizer (perpendicular to the upper polarizer). The polarizer and the cell function as being a light switch. Obviously, such light switch cannot function for the light emitted by the quantum dots at all.

Besides, the polarizer in the traditional liquid crystal display generally uses the iodine to be the dichrois substance. However, the sublimability of the iodine is high, and therefore the heat resistance and the light resistance are bad. The delustering color of the iodine is deep blue. Therefore, it is not an ideal colorless polarizer for the entire visible light range, and is bad for the display result of the liquid crystal display.

SUMMARY OF THE INVENTION

An objective of the present invention is to provide a liquid crystal display to enhance the color gamut by doping the quantum-dot material in the color resist layer, and meanwhile, to utilize an anisotropic dye film manufactured by organic dye molecules to be the polarization layer for reclaiming the scattering light generated by the quantum dots to be the light of linear polarization state. The light leakage issue due to the light polarization state change caused by the quantum-dot material can be prevented to possess higher contrast ratio, and the structure is simple and the cost is low.

For realizing the aforesaid objective, the present invention provides a liquid crystal display, comprising a backlight module, and a liquid crystal panel positioned on the backlight module, and the liquid crystal panel comprises a color resist layer and a polarization layer, and the color resist layer is a color resist layer doped with quantum-dot material, and the polarization layer is an anisotropic dye film manufactured by organic dye molecules.

The liquid crystal panel comprises an array substrate, an upper substrate positioned above the array substrate, an upper polarizer on the upper substrate, and a liquid crystal layer positioned between the array substrate and the upper substrate, and the array substrate comprises a first glass substrate, a TFT layer positioned on the first glass substrate, the color resistor layer positioned on the TFT layer, a pixel electrode layer positioned on the color resist layer, the polarization layer positioned on the pixel electrode layer and a first alignment layer positioned on the polarization layer; the upper substrate comprises a second glass substrate, a black matrix positioned on the second glass substrate and a second alignment layer positioned on the black matrix, and the first alignment layer on the array substrate and the second alignment layer on the upper substrate are oppositely positioned, and the liquid crystal layer is positioned between the first alignment layer and the second alignment layer.

The liquid crystal panel comprises an array substrate, a lower polarizer under the array substrate, a CF substrate positioned above the array substrate and a liquid crystal layer positioned between the array substrate and the CF substrate, and the array substrate comprises a first glass substrate, a TFT layer positioned on the first glass substrate, a first alignment layer positioned on the TFT layer; the CF substrate comprises a second glass substrate, a black matrix positioned on the second glass substrate, the color resist layer positioned on the black matrix, a common electrode layer positioned on the color resist layer, the polarization layer positioned on the common electrode layer and a second alignment layer positioned on the polarization layer, and the first alignment layer on the array substrate and the second alignment layer on the CF substrate are oppositely positioned, and the liquid crystal layer is positioned between the first alignment layer and the second alignment layer.

The liquid crystal panel further comprises an upper polarizer positioned on the CF substrate.

The polarization layer is manufactured by ink injecting or spin coating.

The polarization layer is manufactured by evaporation.

The polarization layer achieves a high polarizing efficiency by a rubbing process.

The organic dye molecules are dye molecules possessing polarized light property.

The dye molecules possessing polarized light property are trisazo dye.

A constitutional formula of the trisazo dye is:

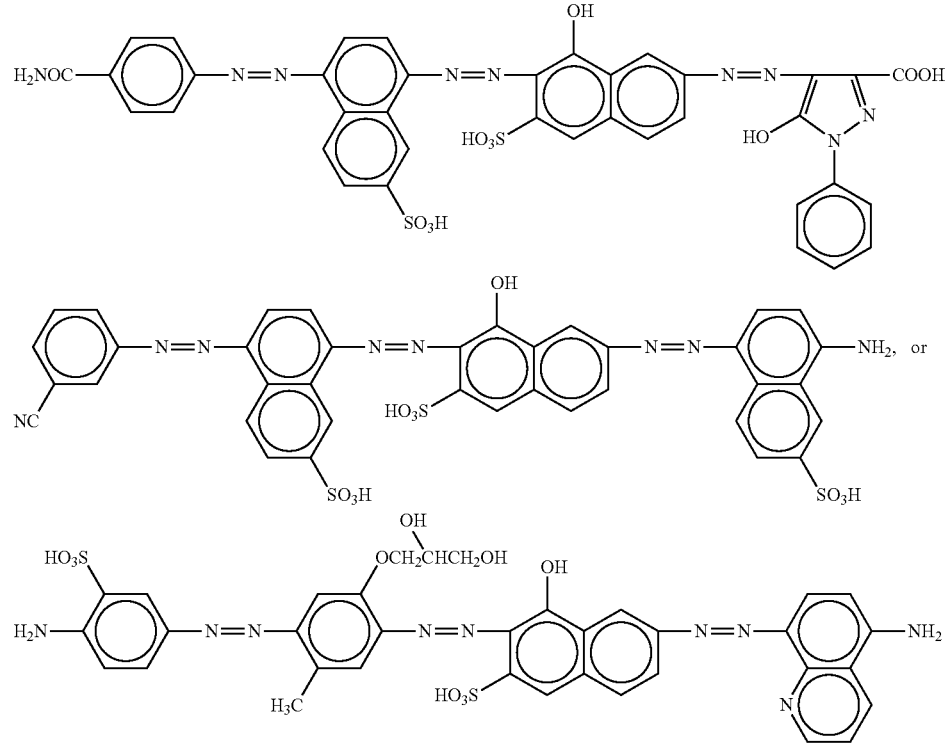

The present invention further provides a liquid crystal display, comprising a backlight module, and a liquid crystal panel positioned on the backlight module, and the liquid crystal panel comprises a color resist layer and a polarization layer, and the color resist layer is a color resist layer doped with quantum-dot material, and the polarization layer is an anisotropic dye film manufactured by organic dye molecules;

wherein the polarization layer achieves an high polarizing efficiency by a rubbing process;

wherein the organic dye molecules are dye molecules possessing polarized light property.

The benefits of the present invention are: the liquid crystal display of the present invention acquires the light of linear polarization by doping the quantum-dot material in the color resist layer to excite the quantum-dots by the backlight to form the light of a certain light spectrum and cooperating with the anisotropic polarization layer manufactured by organic dye molecules for selectively allowing the light of different polarization states to pass through. The light leakage issue due to the light polarization state change caused by the quantum-dot material can be effectively solved to raise the contrast ratio. The polarization layer can be employed to replace the upper or the lower polarizer, and thus, one polarizer attachment process can be omitted to simplify the process, to save the cost and meanwhile to achieve better polarization result.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
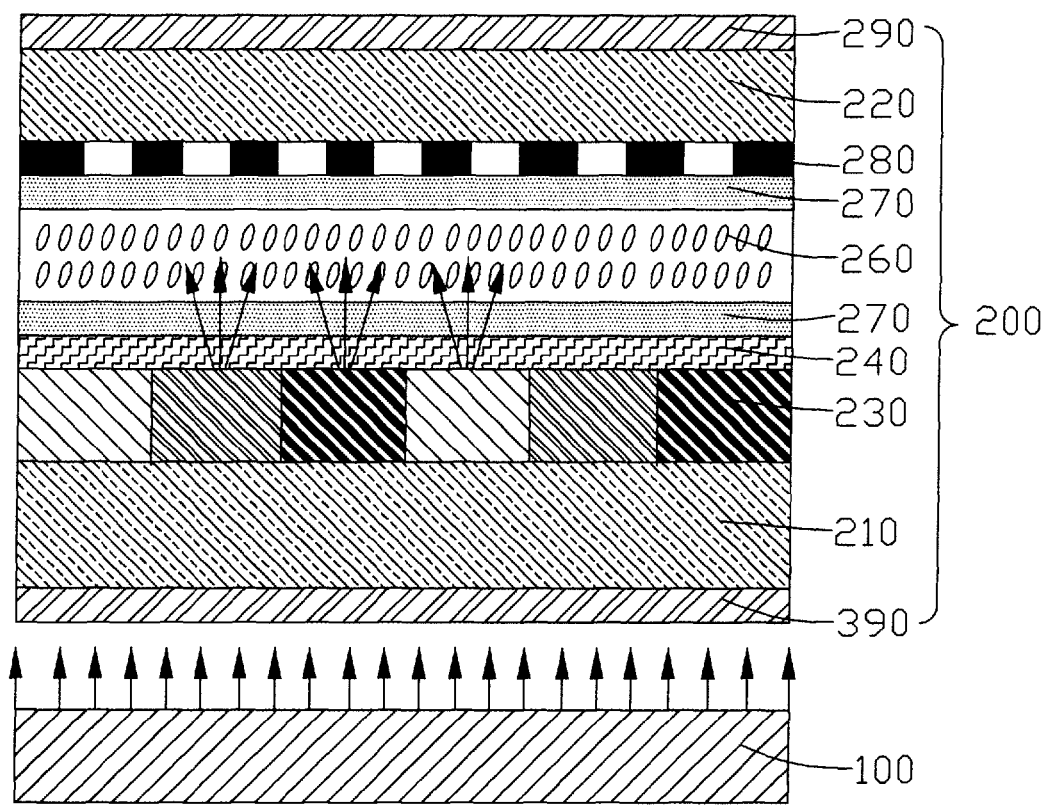
FIG. 1 is a sectional structure diagram of a liquid crystal display according to prior art.
Figure 2:
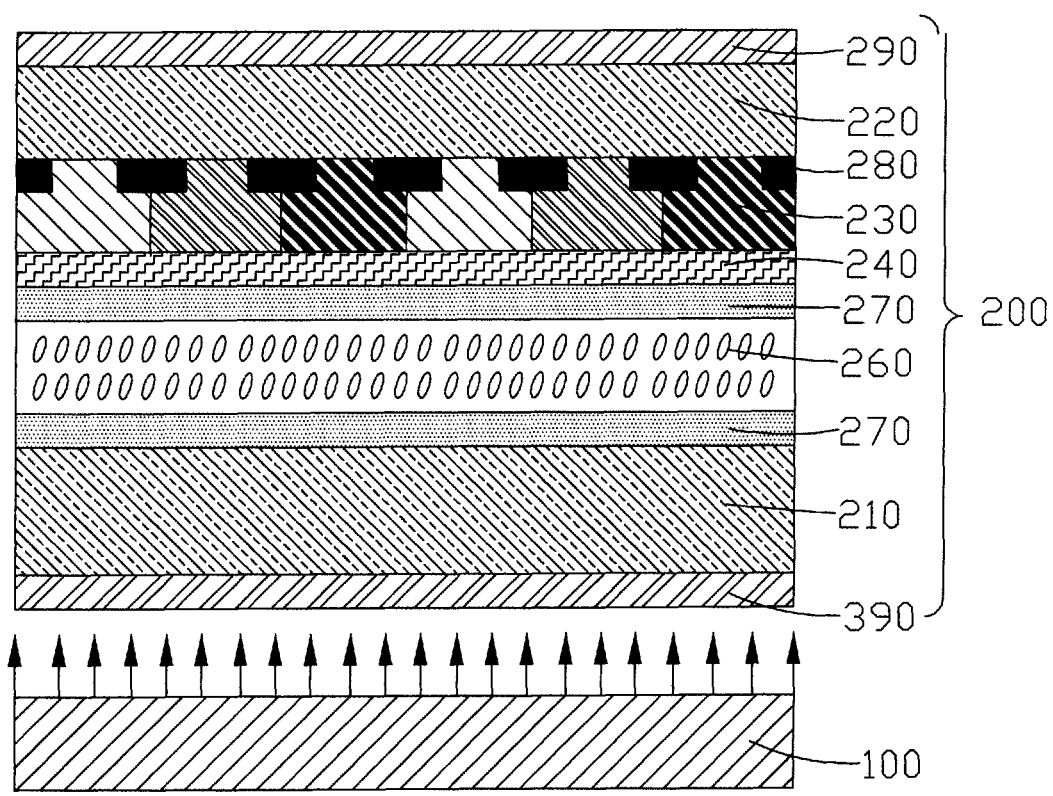
FIG. 2 is a sectional structure diagram of another liquid crystal display according to prior art.
Figure 3:
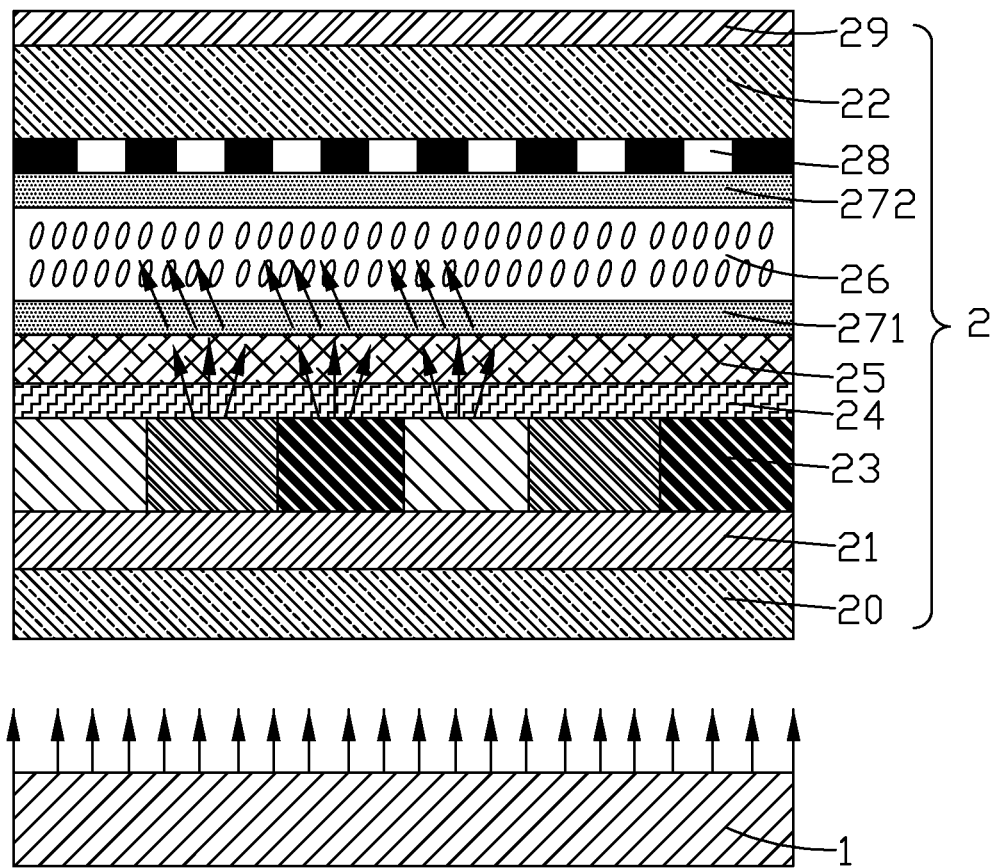
FIG. 3 is a sectional diagram of a liquid crystal display according to the first embodiment of the present invention.

Please refer to FIG. 3, which is a sectional diagram of a liquid crystal display according to the first embodiment of the present invention. The liquid crystal comprises a backlight module 1, and a liquid crystal panel 2 positioned on the backlight module 1.

Specifically, the liquid crystal panel 2 comprises an array substrate, an upper substrate positioned above the array substrate, an upper polarizer 29 on the upper substrate, and a liquid crystal layer 26 positioned between the array substrate and the upper substrate.

Specifically, the array substrate comprises a first glass substrate 20, a TFT layer 21 positioned on the first glass substrate 20, the color resistor layer 23 positioned on the TFT layer 21, a pixel electrode layer 24 positioned on the color resist layer 23, the polarization layer 25 positioned on the pixel electrode layer 24 and a first alignment layer 271 positioned on the polarization layer 25; the upper substrate comprises a second glass substrate 22, a black matrix 28 positioned on the second glass substrate 22 and a second alignment layer 272 positioned on the black matrix 28, and the first alignment layer 271 on the array substrate and the second alignment layer 272 on the upper substrate are oppositely positioned, and the liquid crystal layer 26 is positioned between the first alignment layer 271 and the second alignment layer 272.

The color resist layer 23 is a color resist layer doped with quantum-dot material, and the polarization layer 25 is an anisotropic dye film manufactured by organic dye molecules.

Specifically, the organic dye molecules are dye molecules possessing polarized light property. Preferably, the dye molecules possessing polarized light property are trisazo dye. Specifically, a constitutional formula of the trisazo dye is:

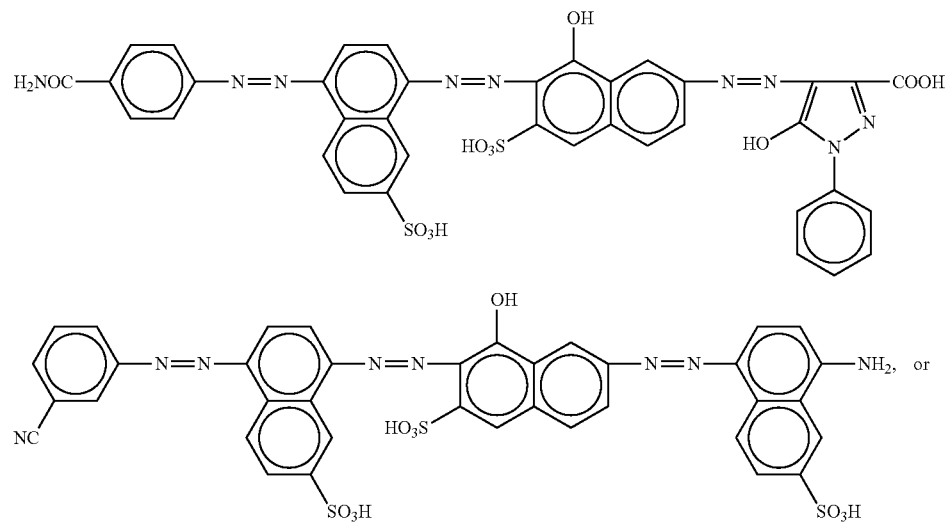

-continued

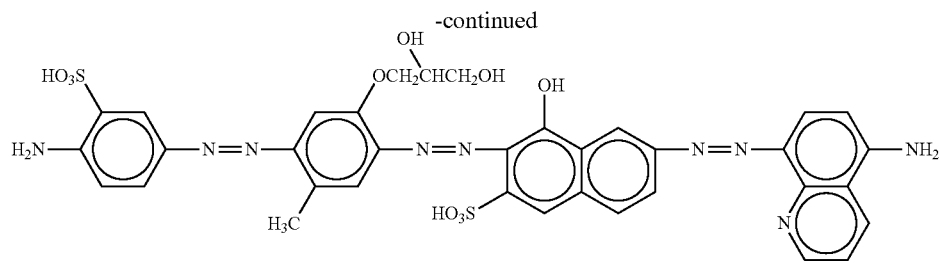

Specifically, the polarization layer 25 can be manufactured by solution process methods such as ink injecting or spin coating, or by evaporation and the polarization layer achieves a high polarizing efficiency by a rubbing process.

In this embodiment, the light of linear polarization is acquired by positioning an anisotropic polarization layer 25 manufactured by organic dye molecules on the pixel electrode layer 24 for selectively allowing the light of different polarization states to pass through before the light enters the liquid crystal layer 26. The light leakage issue due to the light polarization state change caused by the quantum-dot material can be effectively solved. The liquid crystal can function as an optical switch under control of the TFT switch to prevent the light leakage phenomenon and to raise the contrast ratio. Meanwhile, the polarization layer 25 can replace the lower polarizer, and thus, one polarizer attachment process can be omitted to simplify the process, to save the cost. Meanwhile, the polarization layer 25 can achieve better polarization result than what the traditional polarizer can.

Significantly, the black matrix 28 can be positioned at the position of the same side of the color resist layer 23, i.e. on the array substrate. Then, the height of the black matrix 28 needs to form block walls to prevent the color mixture of the color resist layer 23.

Figure 4:
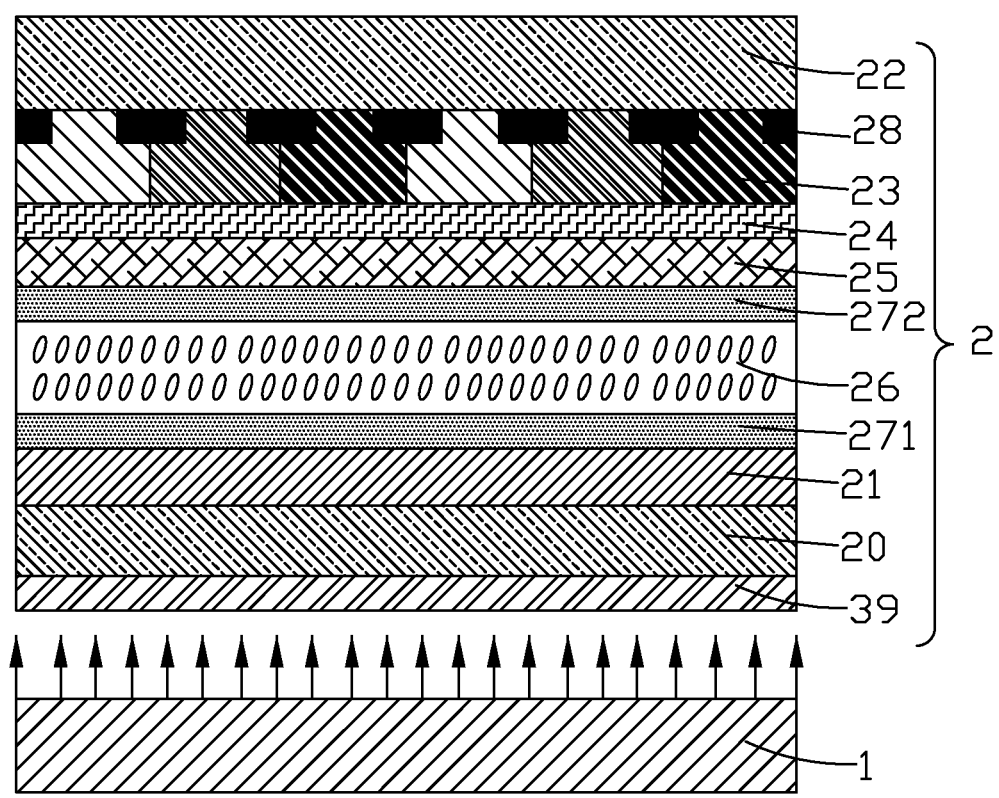
FIG. 4 is a sectional diagram of a liquid crystal display according to the second embodiment of the present invention.

Please refer to FIG. 4, which is a sectional diagram of a liquid crystal display according to the second embodiment of the present invention. The liquid crystal comprises a backlight module 1, and a liquid crystal panel 2 positioned on the backlight module 1.

Specifically, the liquid crystal panel 2 comprises an array substrate, a lower substrate 39 under the array substrate, a CF substrate positioned above the array substrate and a liquid crystal layer 26 positioned between the array substrate and the CF substrate.

Specifically, the array substrate comprises a first glass substrate 20, a TFT layer 21 positioned on the first glass substrate 20, a first alignment layer 271 positioned on the TFT layer 21; the CF substrate comprises a second glass substrate 22, a black matrix 28 positioned on the second glass substrate 22, the color resist layer 23 positioned on the black matrix 28, a common electrode layer 24 positioned on the color resist layer 23, the polarization layer 25 positioned on the common electrode layer 24 and a second alignment layer 272 positioned on the polarization layer 25, and the first alignment layer 271 on the array substrate and the second alignment layer 272 on the CF substrate are oppositely positioned, and the liquid crystal layer 26 is positioned between the first alignment layer 271 and the second alignment layer 272.

The color resist layer 23 is a color resist layer doped with quantum-dot material, and the polarization layer 25 is an anisotropic dye film manufactured by organic dye molecules.

Specifically, the original material and the manufacture method of the polarization layer 25 are the same as those in the first embodiment of the present invention.

Specifically, the polarization layer 25 can be manufactured by solution process methods such as ink injecting or spin coating, or by evaporation and the polarization layer achieves a high polarizing efficiency by a rubbing process.

In this embodiment, by replacing the upper polarizer with the polarization layer 25 manufactured by organic dye molecules, one polarizer attachment process can be omitted to simplify the process, to save the cost, and meanwhile, the polarization layer 25 can achieve better polarization result than the traditional polarizer of which the iodine is utilized to be the dichrois substance.

Figure 5:
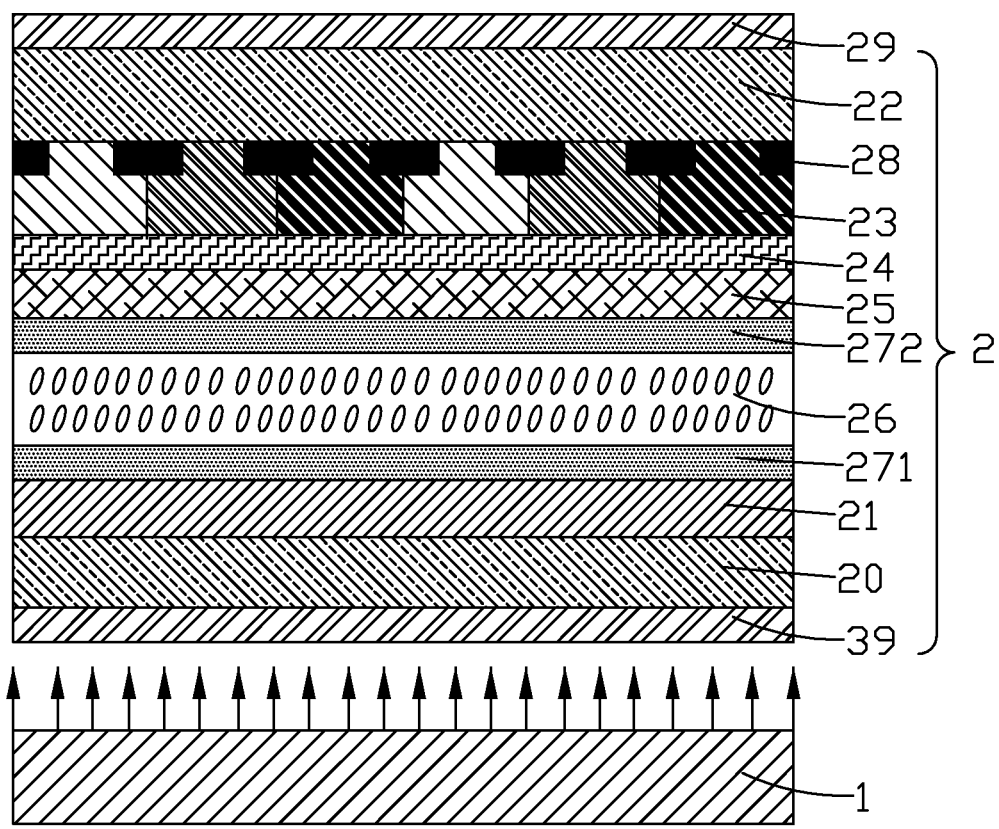
FIG. 5 is a sectional diagram of a liquid crystal display according to the third embodiment of the present invention.

Please refer to FIG. 5, which is a sectional diagram of a liquid crystal display according to the third embodiment of the present invention. The difference from the second embodiment is that the liquid crystal panel 2 further comprises an upper polarizer 29 positioned on the CF substrate. In the structure of the liquid crystal panel 2 shown in FIG. 4, the color resist layer 23 is positioned on the second glass substrate 22 and close to an outer illuminating surface. The ambient light can easily enter to excite the quantum dots in the color resist layer 23 and result in the unnecessary generation of the light to affect the image quality of the display. Therefore, with adding one polarizer or manufacturing one thin film on the surface of the second glass substrate 22 of the CF substrate away from the black matrix 28 and the color resist layer 23, the interference of the ambient light can be prevented.

In conclusion, the liquid crystal display of the present invention acquires the light of linear polarization by doping the quantum-dot material in the color resist layer to excite the quantum-dots by the backlight to form the light of a certain light spectrum and cooperating with the anisotropic polarization layer manufactured by organic dye molecules for selectively allowing the light of different polarization states to pass through. The light leakage issue due to the light polarization state change caused by the quantum-dot material can be effectively solved to raise the contrast ratio. The polarization layer can be employed to replace the upper or the lower polarizer, and thus, one polarizer attachment process can be omitted to simplify the process, to save the cost and meanwhile to achieve better polarization result.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display, comprising a backlight module, and a liquid crystal panel positioned on the backlight module, and the liquid crystal panel comprises a color resist layer and a polarization layer, and the color resist layer is a color resist layer doped with quantum-dot material, and the polarization layer is an anisotropic dye film manufactured by organic dye molecules;

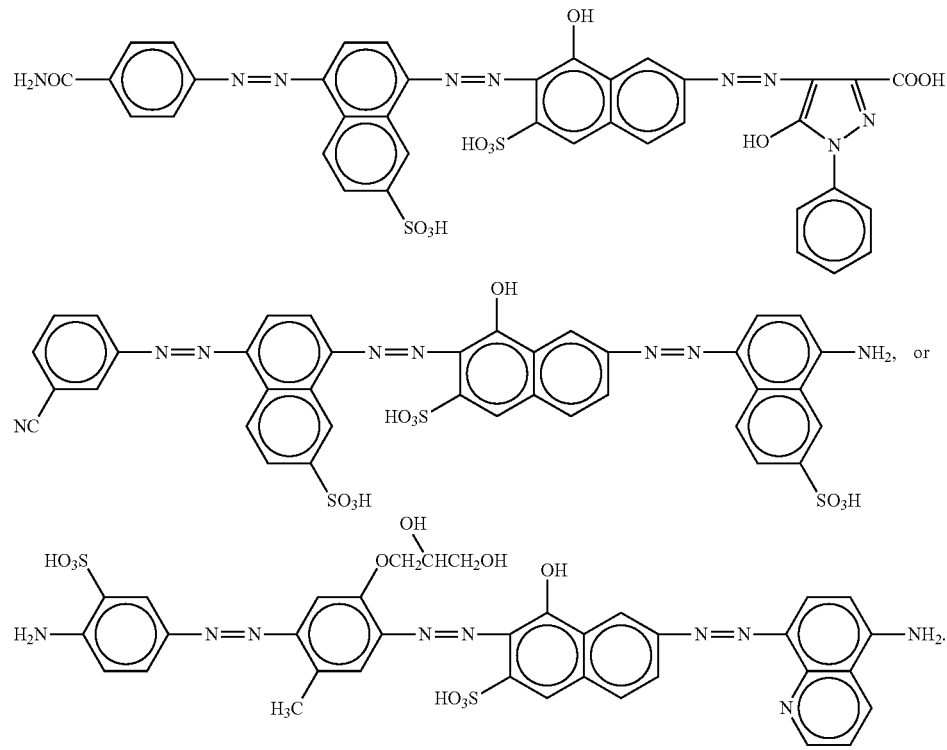

wherein the liquid crystal panel comprises an array substrate, an upper substrate positioned above the array substrate, an upper polarizer on the upper substrate, and a liquid crystal layer positioned between the array substrate and the upper substrate, and the array substrate comprises a first glass substrate, a TFT layer positioned on the first glass substrate, the color resistor layer positioned on the TFT layer, a pixel electrode layer positioned on the color resist layer, the polarization layer positioned on the pixel electrode layer and a first alignment layer positioned on the polarization layer, the upper substrate comprises a second glass substrate, a black matrix positioned on the second glass substrate and a second alignment layer positioned on the black matrix, and the first alignment layer on the array substrate and the second alignment layer on the upper substrate are oppositely positioned, and the liquid crystal layer is positioned between the first alignment layer and the second alignment layer.

2. The liquid crystal display according to claim 1, wherein the polarization layer is manufactured by ink injecting or spin coating.

3. The liquid crystal display according to claim 1, wherein the polarization layer is manufactured by evaporation.

4. The liquid crystal display according to claim 1, wherein the polarization layer achieves a high polarizing efficiency by a rubbing process.

5. The liquid crystal display according to claim 1, wherein the organic dye molecules are dye molecules possessing polarized light property.

6. The liquid crystal display according to claim 5, wherein the dye molecules possessing polarized light property are trisazo dye.

7. The liquid crystal display according to claim 6, wherein a constitutional formula of the trisazo dye is:

8. A liquid crystal display, comprising a backlight module, and a liquid crystal panel positioned on the backlight module, and the liquid crystal panel comprises a color resist layer and a polarization layer, and the color resist layer is a color resist layer doped with quantum-dot material, and the polarization layer is an anisotropic dye film manufactured by organic dye molecules;

wherein the liquid crystal panel comprises an array substrate, a lower polarizer under the array substrate, a CF substrate positioned above the array substrate and a liquid crystal layer positioned between the array substrate and the CF substrate, and the array substrate comprises a first glass substrate, a TFT layer positioned on the first glass substrate, a first alignment layer positioned on the TFT layer; the CF substrate comprises a second glass substrate, a black matrix positioned on the second glass substrate, the color resist layer positioned on the black matrix, a common electrode layer positioned on the color resist layer, the polarization layer positioned on the common electrode layer and a second alignment layer positioned on the polarization layer, and the first alignment layer on the array substrate and the second alignment layer on the CF substrate are oppositely positioned, and the liquid crystal layer is positioned between the first alignment layer and the second alignment layer.

9. The liquid crystal display according to claim 8, wherein the liquid crystal panel further comprises an upper polarizer positioned on the CF substrate.

10. liquid crystal display according to claim 3, wherein the polarization layer achieves a high polarizing efficiency by a rubbing process.

11. The liquid crystal display according to claim 3, wherein the organic dye molecules are dye molecules possessing polarized light property.

12. The liquid crystal display according to claim 11, wherein the dye molecules possessing polarized light property are trisazo dye.

13. A liquid crystal display, comprising a backlight module, and a liquid crystal panel positioned on the backlight module, and the liquid crystal panel comprises a color resist layer and a polarization layer, and the color resist layer is a color resist layer doped with quantum-dot material, and the polarization layer is an anisotropic dye film manufactured by organic dye molecules;
wherein the polarization layer achieves an high polarizing efficiency by a rubbing process;
wherein the organic dye molecules are dye molecules possessing polarized light property; and
wherein the liquid crystal panel comprises an array substrate, a lower polarizer under the array substrate, a CF substrate positioned above the array substrate and a liquid crystal layer positioned between the array substrate and the CF substrate, and the array substrate comprises a first glass substrate, a TFT layer positioned on the first glass substrate, a first alignment layer positioned on the TFT layer; the CF substrate comprises a second glass substrate, a black matrix positioned on the second glass substrate, the color resist layer positioned on the black matrix, a common electrode layer positioned on the color resist layer, the polarization layer positioned on the common electrode layer and a second alignment layer positioned on the polarization layer, and the first alignment layer on the array substrate and the second alignment layer on the CF substrate are oppositely positioned, and the liquid crystal layer is positioned between the first alignment layer and the second alignment layer.

14. The liquid crystal display according to claim 13, wherein the liquid crystal panel further comprises an upper polarizer positioned on the CF substrate.

15. The liquid crystal display according to claim 13, wherein the polarization layer is manufactured by ink injecting or spin coating.

16. The liquid crystal display according to claim 13, wherein the polarization layer is manufactured by evaporation.

17. The liquid crystal display according to claim 13, wherein the dye molecules possessing polarized light property are trisazo dye.

18. The liquid crystal display according to claim 17, wherein a constitutional formula of the trisazo dye is:

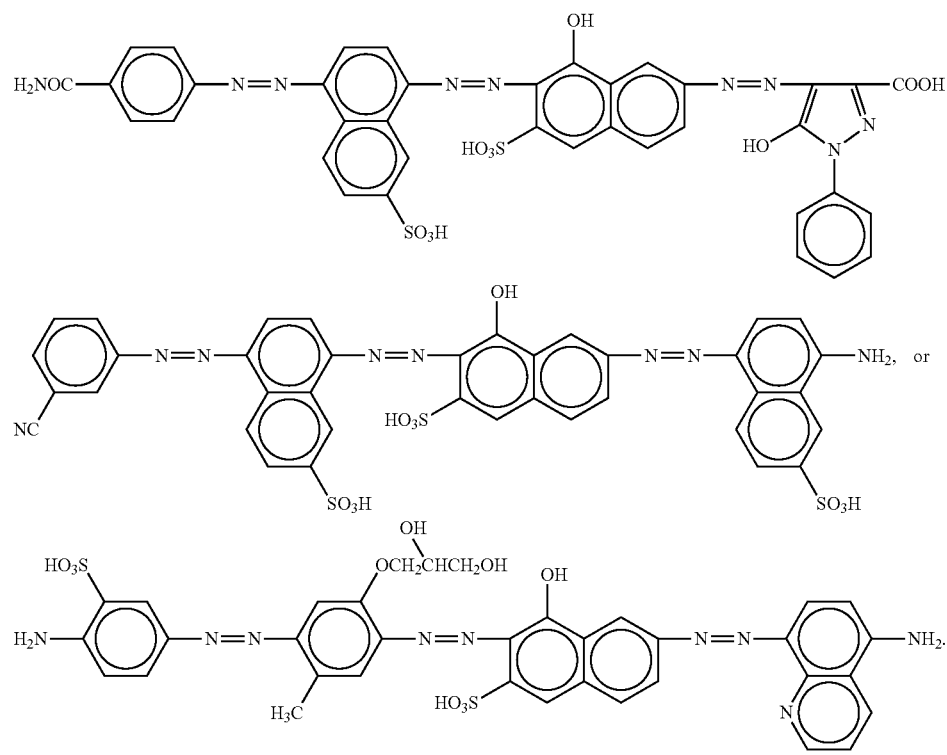

19. A liquid crystal display, comprising a backlight module, and a liquid crystal panel positioned on the backlight module, and the liquid crystal panel comprises a color resist layer and a polarization layer, and the color resist layer is a color resist layer doped with quantum-dot material, and the polarization layer is an anisotropic dye film manufactured by organic dye molecules;
wherein the polarization layer achieves an high polarizing efficiency by a rubbing process;

wherein the organic dye molecules are dye molecules possessing polarized light property; and wherein the liquid crystal panel comprises an array substrate, an upper substrate positioned above the array substrate, an upper polarizer on the upper substrate, and a liquid crystal layer positioned between the array substrate and the upper substrate, and the array substrate comprises a first glass substrate, a TFT layer positioned on the first glass substrate, the color resist layer positioned on the TFT layer, a pixel electrode layer positioned on the color resist layer, the polarization layer positioned on the pixel electrode layer and a first alignment layer positioned on the polarization layer; the upper substrate comprises a second glass substrate, a black matrix positioned on the second glass substrate and a second alignment layer positioned on the black matrix, and the first alignment layer on the array substrate and the second alignment layer on the upper substrate are oppositely positioned, and the liquid crystal layer is positioned between the first alignment layer and the second alignment layer.

* * * * *